July 31, 1956
L. R. JACOBSEN
2,757,288
OSCILLATORS
Filed July 19, 1954
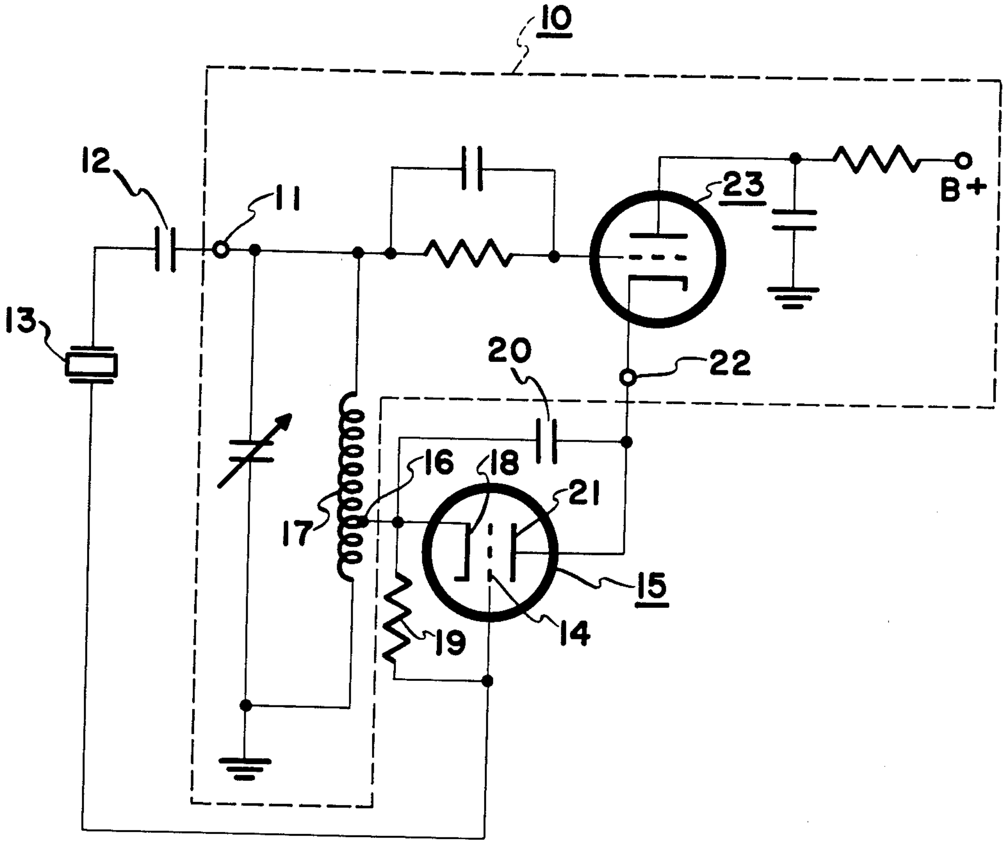
LANCE R. JACOBSEN
*INVENTOR.*
BY Bruce L. Birchard
HIS ATTORNEY United States Patent Office 2,757,288

Patented July 31, 1956

2,757,288

OSCILLATORS

Lance R. Jacobsen, Lynwood, Calif., assignor to Hoffman Electronics Corporation, a corporation of California Application July 19, 1954, Serial No. 444,121

6 Claims. (Cl. 250—36)

This invention is related to electronic oscillators and, more particularly, to an improved oscillator designed to exhibit a degree of stability which heretofore has been unknown to the electronics industry.

In the past, many attempts have been made to design oscillators which will exhibit high degrees of stability. Some of the oscillator designs presently in use have proven quite satisfactory. Engineering efforts have been concentrated on keeping the factor of merit, or "Q", of the oscillator tuned circuit as high as possible, while at the same time restricting the L/C ratio of the oscillator tuned circuit to as low a figure as possible. In addition, conventional oscillator designs restrict grid current to a minimum, maintain supply voltages as constant as possible, employ circuit layouts which keep sources of heat (e. g., electron tubes) as far away as possible from the frequency determining elements, etc. However, despite the success of current oscillator designs in obtaining good stability, none of the designs presently in use approaches the low drift figure (about one part in 10,000,000) of the oscillator design of the present invention. An entirely new and novel approach to oscillator design is made, as shall be hereinafter explained.

Therefore, it is an object of this invention to provide an improved oscillator circuit.

It is a further object of this invention to provide an improved oscillator circuit which will exhibit a remarkably high degree of stability.

According to the present invention, a conventional Hartley oscillator employs a feed-back path which includes a crystal and a second vacuum tube. Variations in the oscillator tube parameters and operating conditions which cause a change in the resonant frequency of the oscillator tank circuit will produce inductive and capacitive currents and corresponding voltages simultaneously which, when applied selectively to the grid and cathode of the second vacuum tube, will cancel each other and thus restore the oscillator circuit to its initial resonant frequency.

The features of the present invention which are believed to be novel are set forth with particularity in the appended claims. The present invention, both as to its organization and manner of operation, together with further objects and advantages thereof may best be understood by reference to the following description taken in connection with the accompanying drawing, in which:

The sole figure is a schematic diagram of an oscillator according to the present invention.

In the sole figure, circuit 10 comprises the circuitry of a conventional Hartley oscillator and requires no further explanation. To terminal 11 of circuit 10 is connected coupling capacitor 12. Crystal 13 is connected between capacitor 12 and control grid 14 of vacuum tube 15. Tap 16 of inductor 17 is connected to cathode 18 of vacuum tube 15. Resistor 19 is connected between grid 14 and cathode 18. Capacitor 20 is connected between cathode 18 and anode 21, of vacuum tube 15. Anode

21 of vacuum tube 15 is in turn connected to terminal 22 of circuit 10.

The circuitry of the sole figure operates as follows. Crystal 13 inherently will possess a high Q characteristic and a large L/C ratio, and therefore, by reason of its insertion, automatically provides sufficient inductance over the operating range to stabilize the frequency of the oscillator against variations in anode voltage (B+).

Let it be supposed that the oscillator tank circuit possesses a high Q and a low L/C ratio, and further, that it is tuned to a frequency which is slightly higher than the series-resonant frequency of crystal 13. In addition, let it further be assumed that changes in tube parameters, operating conditions, etc., contribute to an overall positive incremental change in frequency of the tank circuit. The current in the oscillator tank circuit will, as a result, appear capacitive, while at the same time the current through crystal 13 will appear inductive. These respective currents will appear as voltages 180° out of phase which are simultaneously impressed between the cathode and grid of vacuum tube 15. Hence, these reactive voltages will tend to cancel each other at vacuum tube 15. Thus, the resonant frequency of the oscillator will be restored to its initial frequency regardless of changes in parameters and operating conditions of the oscillator vacuum tube.

The phenomenon above described will take place in case the tank circuit of the oscillator is tuned to a frequency which is below the characteristic frequency of crystal 13. In such a case, the current through the tank circuit will appear inductive, while at the same time the current through crystal 13 will appear capacitive. In either case, voltages appearing at the cathode and the grid of vacuum tube 15 will be 180° out of phase.

It is to be noted that the plate resistance of vacuum tube 15 will fluctuate during various portions of the cycle, and hence capacitor 20 is required to keep the effective cathode bias of vacuum tube 23 fairly constant.

Remarkable results have been attained by the circuit above described. In the region of 5 to 30 megacycles the drift in frequency of such an oscillator is less than 1 cycle at all times, in the absence of frequency shift keying usage, in which the drift figure will be only slightly higher. The subject oscillator is proven to have a range of optimum performance the outer limits of whch are approximately 10% of the crystal frequency on either side of the crystal frequency. However, it should be mentioned that possible drift may be indicated in a 20 cycle band having the crystal frequency as its center frequency.

Conceivably, in the range of lower frequencies, a series-resonant circuit may be substituted for crystal 13, shown in the sole figure. In the higher frequency range, it appears that crystals alone are satisfactory because of their extremely high Q.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An oscillator circuit including, in combination, an oscillator having a first vacuum tube with anode, cathode, and control electrodes, a parallel resonant circuit with a variable capacitive element, an inductive element, and an inductive tap, said parallel resonant circuit having first and second end-terminals, said first end-terminal of said parallel resonant circuit being maintained at a common reference potential, bias means coupled between said second end-terminal of said parallel resonant circuit and said control electrode, and said anode electrode of said first vacuum tube being direct current coupled to a source of voltage which is positive with respect to said common reference potential and radio frequency coupled to said common reference potential; a first capacitor coupled to said second end-terminal of said parallel resonance circuit; series-resonant means coupled to said first capacitor; and a second vacuum tube having an anode coupled to said cathode of said first vacuum tube, a cathode coupled to said inductive tap of said parallel resonance circuit, and a control electrode coupled to said series-resonant means.

2. An oscillator circuit including, in combination, an oscillator having a first vacuum tube with anode, cathode, and control electrodes, a parallel resonant circuit with a variable capacitive element, an inductive element, and an inductive tap, said parallel resonant circuit having first and second end-terminals, said first end-terminal of said parallel resonant circuit being maintained at a common reference potential, bias means coupled between said second end-terminal of said parallel resonant circuit and said control electrode, and said anode electrode of said first vacuum tube being direct current coupled to a source of voltage which is positive with respect to said common reference potential and radio frequency coupled to said common reference potential; a first capacitor coupled to said second end-terminal of said parallel resonance circuit; series-resonant means coupled to said first capacitor; a second vacuum tube having an anode coupled to said cathode of said first vacuum tube, a cathode coupled to said inductive tap of said parallel resonance circuit, and a control electrode coupled to said series-resonant means; a first resistor shunting said cathode and control electrodes of said second vacuum tube; and a second capacitor shunting said cathode and anode electrodes of said second vacuum tube.

3. An oscillator circuit according to claim 1 in which the series-resonant means consists of a crystal.

4. An oscillator circuit according to claim 1 in which the series-resonant means consists of a series-resonant circuit.

5. An oscillator circuit according to claim 2 in which the series-resonant means consists of a crystal.

6. An oscillator circuit according to claim 2 in which the series-resonant means consists of a series resonant circuit.

References Cited in the file of this patent

UNITED STATES PATENTS

| | | |
|---|---|---|
| 1,565,157 | Johnson | Dec. 8, 1925 |
| 1,566,245 | Bracket | Dec. 15, 1925 |
| 2,076,368 | Fyler | Apr. 6, 1937 |
| 2,225,668 | Subkow | Dec. 24, 1940 |